United States Patent
Hotier et al.

(10) Patent No.: US 8,722,955 B2
(45) Date of Patent: May 13, 2014

(54) SIMULATED MOVING BED SEPARATION DEVICE

(75) Inventors: Gerard Hotier, Rueil Malmaison (FR);
Tom Frising, Nanterre (FR); Philibert Leflaive, Mions (FR); Damien Leinekugel le Coco, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 599 days.

(21) Appl. No.: 12/988,077

(22) PCT Filed: Mar. 24, 2009

(86) PCT No.: PCT/FR2009/000319
§ 371 (c)(1),
(2), (4) Date: Jan. 12, 2011

(87) PCT Pub. No.: WO2009/133253
PCT Pub. Date: Nov. 5, 2009

(65) Prior Publication Data
US 2011/0118525 A1    May 19, 2011

(30) Foreign Application Priority Data

Apr. 17, 2008 (FR) .................... 08 02131

(51) Int. Cl.
*B01D 15/18* (2006.01)
*C07C 7/12* (2006.01)

(52) U.S. Cl.
USPC ........ 585/820; 210/198.2; 210/264; 210/284; 210/659; 210/662; 585/825; 585/828

(58) Field of Classification Search
USPC ............... 585/820, 825, 828; 210/198.2, 263, 210/656, 659, 662, 264, 284
See application file for complete search history.

(56) References Cited

U.S. PATENT DOCUMENTS

| | | | | |
|---|---|---|---|---|
| 3,274,099 A * | 9/1966 | Broughton | ................ | 208/310 R |
| 4,036,745 A * | 7/1977 | Broughton | ................ | 208/310 Z |
| 5,578,216 A * | 11/1996 | Hotier et al. | ................... | 210/659 |
| 6,106,702 A * | 8/2000 | Sohn et al. | ................ | 208/310 Z |
| 6,896,812 B1* | 5/2005 | Frey | ............................. | 210/659 |
| 7,638,677 B2* | 12/2009 | Kulprathipanja | ............. | 585/828 |
| 2002/0088754 A1 | 7/2002 | Tanimura et al. | | |

FOREIGN PATENT DOCUMENTS

EP    1 205 224 A1    5/2002
FR    2 721 529 A1    12/1995

OTHER PUBLICATIONS

International Search Report of PCT/FR2009/000319 (Aug. 31, 2009).

* cited by examiner

*Primary Examiner* — Joseph Drodge
(74) *Attorney, Agent, or Firm* — Millen, White, Zelano & Branigan, P.C.

(57) ABSTRACT

A device (SMB) for separation by simulated moving bed adsorption comprises a plurality of elementary adsorption zones $Z_i$ in series operating in a closed loop, and at least one singular adsorption zone with a dead volume which is greater than the adsorption zones $Z_i$, the solid adsorbant of said singular adsorption zone having a granulometry which is lower than that of the solid adsorbant of the ordinary adsorption zones.

21 Claims, 1 Drawing Sheet

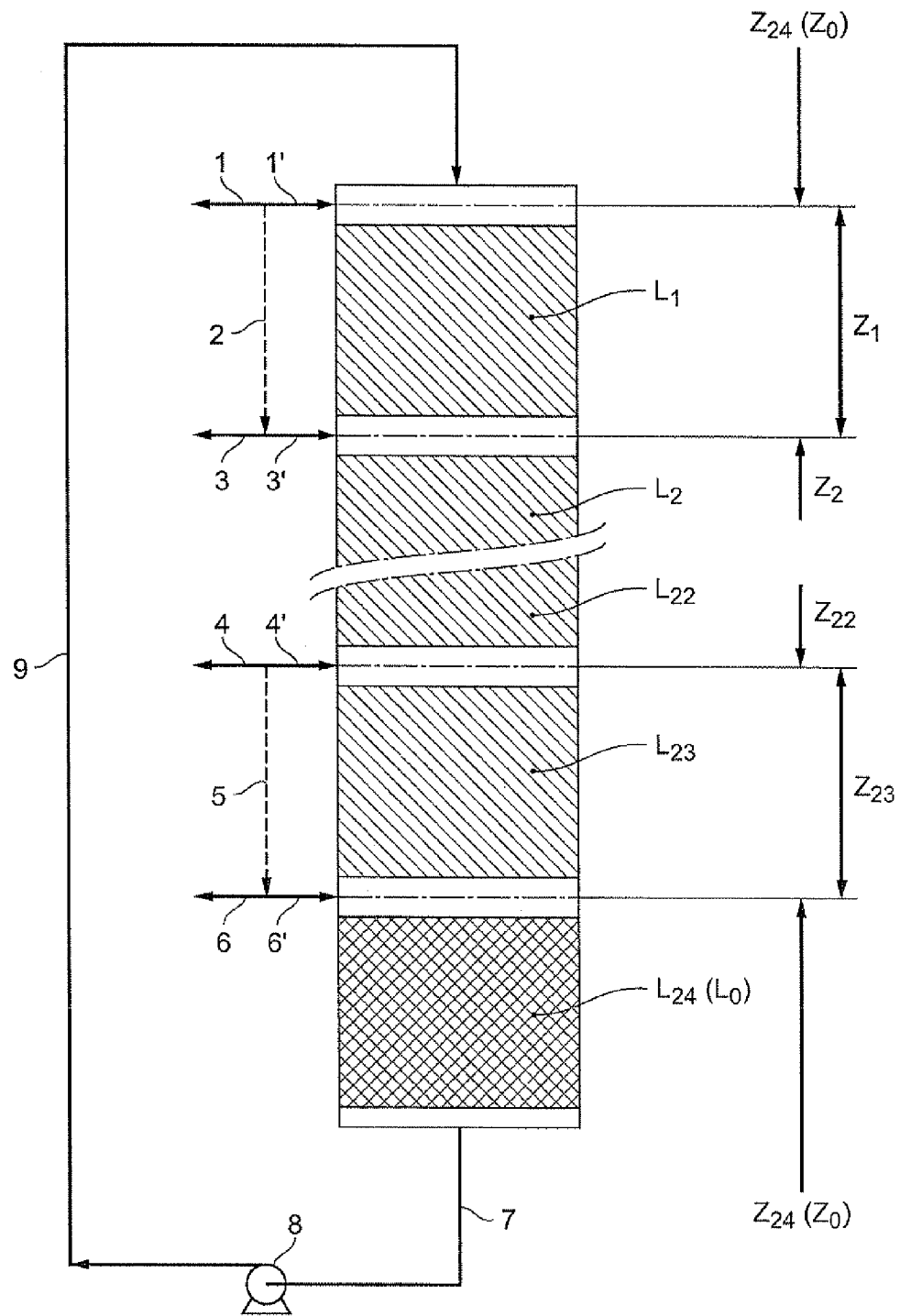

SIMULATED MOVING BED SEPARATION DEVICE

FIELD OF THE INVENTION

The present invention relates to the field of separation of natural or chemical products which are difficult to separate by distillation. A family of processes and associated devices is used which is known as "chromatographic" or "simulated moving bed" or "simulated counter-current" or "simulated co-current" separation devices or processes which will hereinafter be termed "SMB".

A non-exclusive list of the fields concerned is as follows:
separation between normal paraffins on the one hand and branched paraffins, naphthenes and aromatics on the other hand;
olefin/paraffin separation;
separation of para-xylene from other aromatic C8 isomers;
separation of meta-xylene from other aromatic C8 isomers;
separation of ethylbenzene from other aromatic C8 isomers.

Beyond the refinery and petrochemicals complex, there are a number of other applications; examples which may be cited are glucose/fructose separation, the separation of positional isomers of cresol, of optical isomers, etc.

PRIOR ART

A complete description of SMB type units can be found in U.S. Pat. No. 2,985,589 and U.S. Pat. No. 3,214,247. The present invention seeks to solve a problem connected with the existence in such units of non-selective volumes, i.e. volumes containing no solid adsorbant, and which may be distributed in a non-uniform manner in the loop constituting the SMB column or unit under consideration.

A typical example of such a non-selective volume is the line which connects one column to another or a line for recycling from the bottom of the column to the top of that column when the adsorbant is charged into a singular column, with all of the equipment associated with that or those lines, in particular pumps, sampling or measuring means, take-off loops, etc.

Patents FR-2 721 527, FR-2 721 528, FR-2 721 529 and U.S. Pat. No. 6,896,812 explain that perturbations may be caused by the non-selective volumes in the circulation loop, in particular by the recycle pump, as well as the various devices for sampling or analysis.

FR-2 721 527 proposes compensating for the non-selective dead volumes by increasing the flow rate of the recycle pump between the moment when the extract withdrawal point (if the extract is the stream containing the product to be separated) is between the outlet from bed n−1 and the outlet from bed n, said bed n being that which contains a dead volume which is higher than the others. In practice, the flow rate of the pump is increased when the extract is removed from the nth bed. This increase in the flow rate involves an increase in the flow rate for all of the beds during that period, as can be seen in Example 1B of the cited patent. This causes the problem of a higher hydraulic load, which is not optimized, on the sieve and the adsorber, and a perturbation in the concentration profiles in the unit, which causes non-optimized operation even though the purity is improved with respect to that which it would have been without compensation. U.S. Pat. No. 6,896,812 also solves the problem of perturbations caused by non-selective volumes following a modification of the flow rate in the zone in which those non-selective volumes are located. The solutions recommended in patents U.S. Pat. No. 6,896,812 and FR-2 721 527 differ essentially in the fact that FR-2 721 527 increases the flow rate in the recycle pump and thus throughout the adsorber, while U.S. Pat. No. 6,896,812 increases the injection flow rate (of feed or desorbant) but at the same time reduces a withdrawal flow rate (extract or raffinate) by an equivalent quantity, such that the increase in flow rate is only experienced by part of the adsorber. Thus, even though the increase in flow rate is restricted to a part of the process in U.S. Pat. No. 6,896,812, it nevertheless persists during a part of the cycle, raising the same problems as those brought about by implementing FR-2 721 527. It should also be emphasized that U.S. Pat. No. 6,896,812 does not suggest any actual means for carrying out the invention and does not provide any information regarding the real impact of problems induced by large changes in the flow rates which must be experienced by the injection and withdrawal streams. FR-2 721 528 proposes increasing the period termed the switch period each time an injection stream (feed or desorbant) or withdrawal stream (extract or raffinate) passes through the recycle pump (and thus through the volume of the discrete non-selective section). That patent nevertheless imposes two conditions in order to be able to carry it out:

each circuit has to be capable of being switched independently. This means that each of the introduced or removed streams must be managed either using a n-position valve or by n on-off valves, which means that that mode of compensation is excluded in the case of a simulated moving bed where supply is ensured using one or more rotary valve(s);
each zone has to have at least two beds since at certain particular times when the outlet from one zone passes the anisotropy the effects of which are to be corrected, that zone is shortened by one bed. That condition may be highly limiting, especially in the case where the number of beds is reduced (for example by 4 to 12).

Furthermore, control of the process becomes more complex, as shown by the "switch time" tables with or without compensation, rendering that process difficult to carry out.

FR-2 721 529 proposes reducing the volume of bed n by a volume equivalent to the volume of the discrete non-selective volume such that overall, that bed has a volume which is identical to that of the other beds. This means that the vast majority of the perturbations can be eliminated.

The solid adsorbant used in the SMB units depends on the separation carried out. In the case of para-xylene or meta-xylene separation from an aromatic cut containing 8 carbon atoms, a zeolitic adsorbant is generally used.

Such adsorbants are used as adsorption agents in liquid or gas phase processes, preferably of the simulated counter-current type similar to those described in U.S. Pat. No. 2,985,589 which are applied, inter alia, to aromatic C8 cuts (cut comprising aromatic hydrocarbons containing 8 carbon atoms).

In the references listed above, the zeolitic adsorbants are in the powder form or in the form of agglomerates mainly constituted by zeolite and up to 15% to 20% by weight of inert binder.

Agglomerated forms, granules or grains of a variety of forms, are generally preferred, as they do not suffer from the disadvantages inherent to powdered materials.

These agglomerates, whether in the form of platelets, beads or extrudates, are generally constituted by a zeolite powder, which constitutes the active element (in adsorption) and a binder intended to ensure cohesion of crystals in the form of grains and to provide the grains with sufficient mechanical strength to resist vibrations and movements to which they are subjected during use thereof.

Such agglomerates are prepared, for example, by forming zeolite powder into a paste with a clay paste. Zeolitic particles are obtained the granulometry of which is from a few tens of millimeters to several millimeters and which have a satisfactory set of properties, in particular as regards porosity, mechanical strength and abrasion resistance.

In the remainder of the text, the "mean diameter" of the particles constituting the solid adsorbant will be discussed.

Since usually, the solid adsorbant has a granulometric distribution, then conventionally for the mean diameter the distribution which is adopted is the diameter corresponding to 50% by weight in the cumulative distribution diagram.

When the shape of the particles is not spherical, as is the case with extrudates which are cylindrical in shape, then the term "equivalent diameter" is used, usually the Sauter diameter, defined as the diameter of the spherical particle with the same surface to volume ratio as that of the particle under consideration.

One important characteristic of a solid adsorbant bed constituted by particles with a mean diameter dp is the pressure drop which opposes the flow of fluid passing through it, characterized by the superficial flow velocity Vsl.

The pressure drop is directly linked to the granulometry of the solid dp via the Ergun relationship which means that the pressure drop per unit length can be calculated as a function of the straight chain flow velocity (Vsl) and the viscosity of the fluid ($\mu$) which passes through it, the porosity of the bed ($\epsilon$) and the mean granulometry of the solid dp.

$$\Delta P(\text{Pa/m}) = A \cdot \frac{(1-\varepsilon)^2}{\varepsilon^3} \cdot \frac{V_{sl}(\text{m/s})}{d_p^2(\text{m})} \cdot \frac{\mu(\text{cP})}{1000} + B \cdot \frac{(1-\varepsilon)}{\varepsilon^3} \cdot \frac{V_{sl}^2(\text{m/s})}{d_p(\text{m})} \cdot \rho(\text{kg/m}^3)$$

For an adsorbant in the form of spherical particles with a mean diameter dp, the values of the coefficients A and B are very close to 150 and 1.75 respectively. In the straight chain speed range at which SMB units are generally operated, i.e. 10 to 100 m/h, the first of the 2 terms is generally highly predominant.

A second important characteristic of the solid adsorbant bed is the resistance to transfer of material, quantified by the notion of theoretical plate height. For liquid phase separation, the resistance to transfer is, in the vast majority of cases, localized in the pores of the grains. Thus, for a microporous adsorbant in the form of spherical particles, this is located in the portion of the Van Deemter curve in which the height of the theoretical separation plate is proportional to the mean diameter of the adsorbant particles. The Van Deemter curve connects the height of the theoretical plate to the mean granulometry of the adsorbant. A reference can be found in J J van Deemter, F J Zuiderweg, A Klinkerberg, Chemical Engineering Science, 1956, Volume 5, page 271 to 289.

The volume correction for the bed in accordance with FR-2 721 529 is made by preserving the total non-selective volume between the ordinary elementary zones and the singular elementary zones. However, using shorter sieve beds in the singular elementary beds entrains two practical inconveniences:
- the mean pressure drop is smaller in the singular elementary zones compared with the ordinary elementary zones;
- the number of theoretical separation plates is smaller in the singular elementary zones than in the ordinary elementary zones.

A means for overcoming these two disadvantages forms the basis for the present invention.

BRIEF DESCRIPTION OF FIG. 1

FIG. 1 is a diagrammatic representation of a SMB unit comprising 24 beds which identify with the elementary separation zones. Zones 1 to 23 are ordinary zones and zone 24 is a singular zone.

CONCISE DESCRIPTION OF THE INVENTION

The invention consists of a simulated moving bed separation device having improved performance over prior art devices, in particular as regards the drop in performance linked to the existence of one or more singular adsorption zones with larger dead volumes than those of ordinary adsorption zones.

The device for separating a feed F by simulated moving bed adsorption in accordance with the invention comprises a plurality of elementary adsorption zones $Z_i$ with length LA operating in series and in a closed loop, each of said zones comprising, between two successive sequential injection points for feed or eluent, or for the sequential extraction of extract or raffinate, a unique bed $L_i$ of solid adsorbant with volume VA, and a circulating volume in the loop which is empty of adsorbant termed the non-selective void volume $V_i$. These elementary adsorbant zones $Z_i$ are termed "ordinary" and are each constituted by a bed of solid adsorbant with the same active volume VA and mean granulometry dp.

The non-selective volume or dead volume associated with the elementary adsorption zone $Z_i$ is denoted $V_i$.

Provided that all of the ordinary adsorption zones have most substantially the same characteristics of active volume, granulometry of the solid adsorbant and associated dead volume, then these characteristics are denoted VA for the active volume, dp for the mean diameter of the solid adsorbant in said ordinary zone and V for the dead volume.

The device also comprises at least one elementary zone $Z_0$ termed the singular elementary zone with length $LA_0$ constituted by a unique bed with active volume $VA_0$ which is lower than the volume VA of an ordinary zone $Z_i$ and/or comprising an overall non-selective volume $V_0$ which is higher than the dead volume $V_i$ of an ordinary zone $Z_i$. One of the two characteristics of the smaller active volume or larger dead volume is sufficient to designate it a singular adsorption zone.

Clearly, an adsorption zone having both a smaller active volume and a larger dead volume than those of an ordinary adsorption zone is a singular adsorption zone.

In the remainder of the text, for simplification, the term "singular zone" $Z_0$ will be used knowing that there may be several zones of this type in the unit which may have different active volumes $VA_0$ and dead volumes $V_0$.

The same solid adsorbant S is used for the beds of the various ordinary zones, and an average solid adsorbant $S_0$ for the bed of said singular zone $Z_0$, the mean diameter of the particles $dp_0$ of $S_0$ being less than the mean diameter dp of the solid S in the ordinary zones and linked thereto by the inequalities:

$$dp \frac{LA_0}{LA} < dp_0 \le dp \sqrt{\frac{LA_0}{LA}}$$

in which expression LA and $LA_0$ respectively designate the length of the adsorbant bed in an ordinary zone and in the singular zone under consideration.

The term "mean" solid applied to the singular adsorption zone indicates that in certain cases, this solid may be constituted by a mixture of several solid adsorbants.

The chemical nature of the solid adsorbant used in the ordinary zones and in the singular zone or zones is generally the same.

The choice of the granulometry of the solid adsorbant used in a singular zone means that a pressure drop in said singular zone with bed length $LA_0$ which is equal to the pressure drop in the ordinary zones with bed length LA can be obtained, to within plus or minus 8%, preferably to within plus or minus 5%.

In a variation of the device of the invention, the mean diameter $dp_0$ of the solid used in a singular zone satisfies the following relationship to within plus or minus 5%:

$$dp_0 = dp\left(\frac{LA_0}{LA}\right)^{0.75}$$

In a variation of the device of the invention, the solid adsorbant $S_0$ of a singular adsorption zone is a mixture of at least two solid adsorbants $S_1$ and $S_2$ with a mean particle diameter, respectively $dp_1$ and $dp_2$, where $dp_1 < dp_2$, the percentage of solid $S_1$ in each of the singular adsorption zones being strictly greater than the percentage of solid $S_1$ in the ordinary adsorption zones.

In a particular case of the preceding variation, the solid $S_1$ with a smaller granulometry is only found in the singular adsorption zone or zones. The percentage of $S_1$ in each of the beds of the ordinary elementary zones is thus zero.

In other words, the granulometry condition which is proper to the singular adsorption zones is satisfied by adding a suitable quantity of solid $S_1$ with diameter $dp_1$ which is strictly less than the diameter dp to the solid adsorbant S present in the ordinary adsorption zones.

In a variation, the solid $S_1$ may be obtained by selecting batches of solid adsorbant with a smaller granulometry, after sampling the various batches.

The invention also concerns the use of a device for particular separations, in particular for separation of a xylene (in particular para-xylene or meta-xylene) from an aromatic C8 cut (containing 8 carbon atoms).

The invention concerns, for example, the use of the device described for separating an olefinic hydrocarbon from a cut comprising said hydrocarbon mixed with other hydrocarbons at least some of which are non-olefinic.

The invention also concerns the use of the device described for separating at least one straight chain paraffin from a cut comprising said straight chain paraffin or paraffins mixed with other hydrocarbons which are not straight chain paraffins.

The invention also concerns the use of the device described for separating an olefinic hydrocarbon or one or more normal paraffinic hydrocarbons from a mixture of hydrocarbons comprising hydrocarbons belonging to other chemical families.

DETAILED DESCRIPTION OF THE INVENTION

The invention describes a SMB device for separating a feed F by simulated moving bed adsorption, comprising a plurality of elementary adsorption zones $Z_i$, in series operating in a closed loop, each of said zones comprising, between two successive sequential injection points (for feed or eluent) or sequential extraction points (for extract or raffinate), a unique bed $L_i$ of solid adsorbant with volume $VA_i$ corresponding to a bed length LA and an overall dead volume $V_i$ the device also comprising at least one elementary zone $Z_0$ termed the particular elementary zone which is different from the ordinary zones $Z_i$ by its overall dead volume $V_0$ which is greater than V and/or by its unique bed $L_0$ of solid adsorbant with volume $VA_0$ which is less than VA.

In the remainder of the text, provided that all of the ordinary zones $Z_i$ are substantially identical as regards the characteristics of the solid adsorbant and the volume of the bed, the index i is dispensed with and we shall use the terms "volume VA" for the volume of the bed of solid adsorbant, with the corresponding length LA, and the volume V for the dead volume associated with the ordinary zone under consideration.

The term volume $VA_0$ is used to denote the volume of the bed of adsorbant of the singular zone, with corresponding length $LA_0$, and with dead volume $V_0$ associated with the singular zone under consideration. A zone is termed singular if its dead volume $V_0$ is greater than that of the ordinary zones (V) and/or if its active volume $VA_0$ is lower than that of the ordinary zones (VA).

The device of the present invention uses the same solid adsorbant S for the beds of the various ordinary zones and an average solid adsorbant $S_0$ for the bed of said singular zone $Z_0$, the mean diameter of the particles $dp_0$ of $S_0$ being less than that of the solid S (dp) in the ordinary zones and linked thereto by the inequalities:

$$dp\frac{LA_0}{LA} < dp_0 \leq dp\sqrt{\frac{LA_0}{LA}}$$

Preferably, $dp_0$ is selected so as to be as close as possible to the geometric mean of the upper and lower limits of the above inequality.

In accordance with one implementation of the device, the average solid adsorbant $S_0$ of the singular zone $Z_0$ is a mixture of at least two solid adsorbants $S_1$ and $S_2$ with different mean particle diameters $dp_1$ and $dp_2$, with $dp_2 > dp_1$, the percentage of $S_1$ in the singular zone being strictly greater than the percentage of $S_1$ in each of the ordinary zones.

The beds of the ordinary elementary zones may optionally be constituted by a homogeneous unique solid adsorbant S with a mean particle diameter dp. In this case, the average solid adsorbant $S_0$ comprises at least one other solid adsorbant $S_1$ with a mean particle diameter $dp_1$ which is less than dp.

One means of carrying out the invention is thus to install in the singular elementary zone(s) a specific solid adsorbant manufactured such that it has a granulometry which is lower than that of the solid adsorbant used in the ordinary elementary zones.

According to another implementation of the invention, a selection can be carried out from within a batch of molecular sieve intended for a particular unit. Thus, after having measured the mean diameter of the particles of each batch, the batch(es) with the lowest granulometry(ies) is (are) selected so as to charge the selected batches into the singular elementary zone(s), the remainder of the batch being charged into the ordinary beds.

The skilled person could use any suitable method for sorting to reduce the mean diameter of the solid adsorbant used in the particular elementary zone or zones.

The invention also concerns the use of the device for carrying out specific separations.

In particular, the invention concerns the use of a device for separating a xylene, for example para-xylene or meta-xylene from an aromatic hydrocarbon cut containing 8 carbon atoms.

The invention also concerns the use of a device for separating an olefinic hydrocarbon from a cut comprising said hydrocarbon mixed with other non-olefinic hydrocarbons.

The invention also concerns the use of a device for separating at least one straight chain paraffin from a cut comprising said straight chain paraffin or paraffins mixed with other hydrocarbons which are not straight chain paraffins. The remainder of the text will be better understood by reference to FIG. 1.

The singular FIG. 1 diagrammatically shows a portion of a simulated moving bed separation device in accordance with the invention.

It shows, in a non limiting manner, a column comprising 24 beds of solid adsorbant $L_1, L_2, \ldots, L_{22}, L_{23}$, and $L_{24}$ (corresponding to $L_0$).

Each of these beds is represented by a hatched rectangle. Between two successive beds of the column is shown a non-hatched non-selective void volume corresponding to the internal void volume of the column of the system for distribution/extraction of the various entering and leaving fluids, which is also flushed by the principal fluid circulating in the column. An accurate definition of the distribution/extraction systems can be found in U.S. Pat. No. 6,537,451 and in application U.S. Ser. No. 03/127,394.

Conventionally, the volumes between the grains of adsorbant and the internal volumes of the grains of adsorbant are not counted in the dead volumes.

The volumes which are not accessible to fluids moving in the loop in the column or in the external bypass lines are also not counted in the dead volumes. This is the case, for example, with the volumes of the supply/extraction connecting pieces for the inlet fluids (supply fluids: feed and desorbant) and outlet fluids (withdrawn fluids; extract and raffinate) which are not flushed by the principal fluid circulating in the column nor by the principal fluid circulating in the external bypass lines, but only by one or more of the inlet or outlet fluids.

In contrast, a certain number of volumes which are external to the column are counted in the non-selective void volume:

The singular volumes corresponding to the transfer lines for principal fluid between two adsorption zones or the recycle line from a bottom of the column to the head of that same column or to the transfer line between two columns, if the device comprises several columns in series. These various singular volumes typically comprise the internal volumes of these lines, but also the internal volume or volumes of the pumps or compressors allowing circulation of the fluid in a closed loop in the device.

The dead volumes may also comprise the internal volumes of the measurement apparatus such as analyzers, etc.

Conventionally, half of each non-selective void volume corresponding to a plate located between two successive beds of adsorbant (the non hatched volume between two successive beds of adsorbant, with a dashed median line) is attached to the zone $Z_i$ comprising the immediately upstream bed of adsorbant $L_i$, with the other half to the zone $Z_{i+i}$ comprising the immediately downstream bed of adsorbant $L_{i+1}$.

In addition to the bed of adsorbant $L_1$, zone $Z_1$ comprises half of the dead volume of the upstream distribution system (at the column head) and half of the non-selective void volume of the downstream distribution system (between beds $L_1$ and $L_2$).

It also comprises the internal volume of the external bypass line 2, if it exists, i.e. in this case that of lines 1', 2' and 3', also counted as non-selective void volume, while the volume of the connecting pieces 1 and 3 is not.

The elements in zone $Z_{23}$ below bed $L_{22}$ are similar to those of zone $Z_1$.

Zone $Z_{23}$ comprises, in addition to the bed of adsorbant $L_{23}$, half of the non-selective void volume of the upstream distribution system (between beds $L_{22}+L_{23}$) and half of the non-selective void volume of the downstream distribution system (between beds $L_{23}$ and $L_{24}$).

Zone $Z_{23}$ also includes the internal volume of the external bypass line 5 if it exists, i.e. in this case that of lines 4', 5' and 6', also counted as a non-selective void volume, while the volume of connecting pieces 4 and 6 is not.

Zones $Z_1$ to $Z_{23}$ are ordinary elementary zones, each having a substantially identical adsorbant bed volume and a substantially identical non-selective void volume.

In contrast, zone $Z_{24}$ is singular. It comprises the singular supplemental non-selective void volumes corresponding to the recycle line 7 then 9, as well as the recycle pump 8. These supplemental non-selective void volumes are not negligible compared with the non-selective void volume of each of the ordinary elementary zones. As a consequence, to correct the deleterious effect of this supplemental non-selective void volume, a smaller volume of solid adsorbant is used for the bed of adsorbant $L_{24}$ of zone $Z_{24}$.

Zone $Z_{24}$ corresponds in FIG. 1 to the singular elementary zone $Z_0$ described generically in the text. This zone $Z_{24}$ uses an average solid adsorbant $S_0$ which is different from the mean adsorbant S used in the ordinary elementary zones.

This solid adsorbant $S_0$ has a granulometry, measured by the mean particle diameter $dp_0$, which is less than the mean particle diameter dp of the solid adsorbant S used in the ordinary elementary zones, such that the pressure drop taken over the weighted mean of the internal flow rates during the cycle is at least equal for bed $L_{24}$ to the pressure drop taken over the weighted mean of the internal flow rates during the cycle for the mean of beds $L_1$ to $L_{23}$.

Simultaneously, the choice of mean diameter $dp_0$ of the adsorption solid $S_0$ of the singular zone $Z_{24}$ can produce a number of theoretical separation plates of bed $L_{24}$ which is at most equal to the mean of the number of theoretical separation plates for beds $L_1$ to $L_{23}$.

The solid adsorbant $S_0$ may in particular be constituted by a homogeneous solid adsorbant $S_1$ with a lower granulometry or by a mixture of a first quantity of said solid adsorbant $S_1$ with another suitable quantity of solid adsorbant S used in the ordinary adsorption zones.

EXAMPLES

Example 1

In Accordance with the Prior Art

Para-xylene was separated starting from a feed composed of 20% of para-xylene, 25% of ortho-xylene, 50% of meta-xylene and 5% of ethylbenzene.

The simulated moving bed separation unit SMB comprised 24 beds of solid adsorbant installed in a column with an internal diameter of 7 m. Beds $L_1$ to $L_{23}$, numbered from the column head, were identical in height, at 1.13 m. A recycle line with a dead volume equal to 10% of the common volume of beds $L_1$ to $L_{23}$ and comprising the recycle pump connected bed $L_{24}$ at the column bottom to bed $L_1$ at the column head.

This recycle line was located between the injection/extraction point located between beds $L_{23}$ and $L_{24}$ and the injection/extraction point located at the column head upstream of bed $L_1$. This recycled line thus belonged to the particular elementary zone corresponding to the adsorbant bed $L_{24}$.

In accordance with the prior art, to compensate for the effect of this non-selective volume, the volume of the 24$^{th}$ bed was reduced by an equivalent volume. Thus, this 24$^{th}$ bed was 1.02 m in height instead of 1.13 m.

The solid adsorbant S used was a unique homogeneous adsorbant which was identical for all beds, namely a BaX type zeolite manufactured as described in Example 1 of patent FR-2 789 914 or in Example 1 of U.S. Pat. No. 6,884,918. Its mean granulometry was 0.63 mm. The charging process used produced a bed porosity of 0.315.

The eluent used was para-diethyl benzene (PDEB). The mean temperature was 175° C. and the pressure was 1.5 MPa.

The distribution of the beds was as follows:
5 beds in zone 1;
9 beds in zone 2;
7 beds in zone 3;
3 beds in zone 4.

The switch time employed was 70.8 seconds. The liquid flow rates in the various zones were as follows:
30.06 m$^3$/min in zone 1;
25.87 m$^3$/min in zone 2;
32.66 m$^3$/min in zone 3;
22.58 m$^3$/min in zone 4.

Under these conditions, we obtained a mean pressure drop weighted for the four flow rates given above of 0.0252 MPa for the ordinary beds and 0.0229 MPa for the singular bed.

We obtained 10 theoretical plates for the ordinary beds and 9 theoretical plates for the singular bed.

The para-xylene yield was 95.6% and the purity of the para-xylene obtained was 99.73%.

Example 2

In Accordance with the Invention

The separation was the same as in Example 1 under identical conditions (pressure, temperature, switch time) in a column with the same diameter also comprising 24 beds, with the same distribution of beds per zone, using the same PDEB eluent.

The recycle line was identical to that of Example 1.

The geometry of the beds remained that of the preceding example, i.e. 1.13 m for the ordinary beds and 1.02 m for the singular bed.

The solid adsorbant S used in the unit was strictly identical to the preceding one, but 3.8% of the batch of sieve which had a smaller granulometry had been isolated. One batch was typically constituted by a quantity of solid adsorbant in the range 0.5 to 1.5 tonnes, delivered in the form of big bags.

Thus, the 23 ordinary beds were charged with a sieve with a mean granulometry of 0.632 mm and the singular bed was charged with a sieve with a mean granulometry of 0.594 mm. The charging procedure remained the same and the bed porosity was 0.315 in both cases.

Under these conditions, the mean pressure drop weighted for the above four flow rates was 0.0251 MPa for the ordinary beds and 0.0251 MPa for the singular bed.

We obtained 9.97 theoretical plates for the ordinary beds and 9.57 theoretical plates for the singular bed. The difference in pressure drop between the ordinary bed and the singular bed was cancelled out and the difference in the number of theoretical separation plates between the ordinary bed and the singular bed was reduced by 60%.

The para-xylene yield was 95.7% (i.e. an increase of 0.1% over the prior art unit) and the purity of the para-xylene obtained was 99.73% (identical to that obtained with the prior art unit).

The invention claimed is:

1. A device for separating a feed F by simulated moving bed adsorption, said device comprising:
a plurality of elementary adsorption zones $Z_i$ in series operating in a closed loop, termed ordinary zones, each of said ordinary zones comprising, between two successive points for sequential injection of feed or eluent, or for sequential extraction of extract or raffinate, a unique bed $L_i$ of solid adsorbant with volume $VA_i$ and a volume for circulation in the loop which is empty of adsorbant, termed the non-selective void volume $V_i$, and
at least one elementary zone $Z_0$ termed the singular elementary zone, comprising: (a) an overall dead volume $V_0$ which is higher than the dead volume $V_i$ of an ordinary elementary zone $Z_i$ and/or (b) a unique bed $L_0$ of solid adsorbant with volume $VA_0$ which is less than VA,
in which the same solid adsorbant S is incorporated in the beds of the various ordinary zones, and an average solid adsorbant $S_0$ for the bed of said singular elementary zone(s) $Z_0$, the mean diameter of the particles $dp_0$ of the solid adsorbant $S_0$ being less than the mean diameter $dp$ of the solid adsorbant S in the ordinary elementary zones and linked thereto by the inequalities:

$$dp \frac{LA_0}{LA} < dp_0 \le dp \sqrt{\frac{LA_0}{LA}}$$

in which expression LA and $LA_0$, respectively, designate the length of the bed of adsorbant in an ordinary zone and the length of the bed of adsorbant in the singular zone under consideration.

2. A device according to claim 1, in which $dp_0$ is selected such that the pressure drop in the singular elementary zone with length $LA_0$ is equal to the pressure drop in the ordinary elementary zones with bed length LA to within plus or minus 8%.

3. A device according to claim 2, in which the solid adsorbant $S_0$ is a mixture of at least two solid adsorbants $S_1$ and $S_2$, said adsorbants $S_1$ and $S_2$ having mean particle diameters of $dp_1$ and $dp_2$, respectively, where $dp_1 < dp_2$, and the percentage of $S_1$ in each of the singular elementary zones is greater than the percentage of $S_1$ in the ordinary elementary zones.

4. A device according to claim 2, in which the solid adsorbant in each of the beds of the ordinary elementary zones is constituted by a unique solid adsorbant S with a mean particle diameter $dp$ and in which the average solid adsorbant $S_0$ of the singular elementary zone comprises at least one other solid adsorbant $S_1$ with a mean particle diameter $dp_1$ which is strictly less than $dp$.

5. A device according to claim 3, in which the solid adsorbant in each of the beds of the ordinary elementary zones is constituted by a unique solid adsorbant S with a mean particle diameter $dp$ and in which the average solid adsorbant $S_0$ of the singular elementary zone comprises at least one other solid adsorbant $S_1$ with a mean particle diameter $dp_1$ which is strictly less than $dp$.

6. A device according to claim 1, in which the mean diameter $dp_0$ of the solid used in a singular zone satisfies the following relationship to within plus or minus 5%:

$$dp_0 = dp\left(\frac{LA_0}{LA}\right)^{0.75}.$$

7. A device according to claim 6, in which the solid adsorbant $S_0$ is a mixture of at least two solid adsorbants $S_1$ and $S_2$, said adsorbants $S_1$ and $S_2$ having mean particle diameters of $dp_1$ and $dp_2$, respectively, where $dp_1 < dp_2$, and the percentage of $S_1$ in each of the singular elementary zones is greater than the percentage of $S_1$ in the ordinary elementary zones.

8. A device according to claim 6, in which the solid adsorbant in each of the beds of the ordinary elementary zones is constituted by a unique solid adsorbant S with a mean particle diameter dp and in which the average solid adsorbant $S_0$ of the singular elementary zone comprises at least one other solid adsorbant $S_1$ with a mean particle diameter $dp_1$ which is strictly less than dp.

9. A device according to claim 7, in which the solid adsorbant in each of the beds of the ordinary elementary zones is constituted by a unique solid adsorbant S with a mean particle diameter dp and in which the average solid adsorbant $S_0$ of the singular elementary zone comprises at least one other solid adsorbant $S_1$ with a mean particle diameter $dp_1$ which is strictly less than dp.

10. A device according to claim 9, in which the solid adsorbant $S_1$ with particle diameter $dp_1$ which is strictly less than the diameter of the particles dp of the solid adsorbant of the ordinary zones.

11. A device according to claim 1, in which the solid adsorbant $S_0$ is a mixture of at least two solid adsorbants $S_1$ and $S_2$, said adsorbants $S_1$ and $S_2$ having mean particle diameters of $dp_1$ and $dp_2$, respectively, where $dp_1 < dp_2$, and the percentage of $S_1$ in each of the singular elementary zones is greater than the percentage of $S_1$ in the ordinary elementary zones.

12. A device according to claim 11, in which the percentage of $S_1$ in each of the ordinary elementary zones is zero.

13. A device according to claim 11, in which the solid adsorbant in each of the beds of the ordinary elementary zones is constituted by a unique solid adsorbant S with a mean particle diameter dp and in which the average solid adsorbant $S_0$ of the singular elementary zone comprises at least one other solid adsorbant $S_1$ with a mean particle diameter $dp_1$ which is strictly less than dp.

14. A device according to claim 1, in which the solid adsorbant in each of the beds of the ordinary elementary zones is constituted by a unique solid adsorbant S with a mean particle diameter dp and in which the average solid adsorbant $S_0$ of the singular elementary zone comprises at least one other solid adsorbant $S_1$ with a mean particle diameter $dp_1$ which is strictly less than dp.

15. A device according to claim 14, in which the solid adsorbant $S_1$ with particle diameter $dp_1$ which is strictly less than the diameter of the particles dp of the solid adsorbant of the ordinary zones.

16. In a simulated moving bed adsorption process comprising separating a xylene from a cut of aromatic hydrocarbons containing 8 carbon atoms, the improvement wherein the process is conducted in a device according to claim 1.

17. In a simulated moving bed adsorption process comprising separating para-xylene from a cut of aromatic hydrocarbons containing 8 carbon atoms, the improvement wherein the process is conducted in a device according to claim 1.

18. In a simulated moving bed adsorption process comprising separating an olefinic hydrocarbon from a cut comprising said hydrocarbon mixed with other hydrocarbons at least some of which are non-olefinic, the improvement wherein the process is conducted in a device according to claim 1.

19. In a simulated moving bed adsorption process comprising separating at least one straight chain paraffin from a cut comprising this straight chain paraffin or paraffins mixed with other hydrocarbons which are not straight chain paraffins, the improvement wherein the process is conducted in a device according to claim 1.

20. A device according to claim 1, in which $dp_0$ is selected such that the pressure drop in the singular elementary zone with length $LA_0$ is equal to the pressure drop in the ordinary elementary zones with bed length LA to within plus or minus 5%.

21. A device according to claim 20, in which the solid adsorbant $S_0$ is a mixture of at least two solid adsorbants $S_1$ and $S_2$, said adsorbants $S_1$ and $S_2$ having mean particle diameters of $dp_1$ and $dp_2$, respectively, where $dp_1 < dp_2$, and the percentage of $S_1$ in each of the singular elementary zones is greater than the percentage of $S_1$ in the ordinary elementary zones.

* * * * *

UNITED STATES PATENT AND TRADEMARK OFFICE
CERTIFICATE OF CORRECTION

PATENT NO.        : 8,722,955 B2                                           Page 1 of 1
APPLICATION NO.   : 12/988077
DATED             : May 13, 2014
INVENTOR(S)       : Hotier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Twenty-ninth Day of September, 2015

Michelle K. Lee
*Director of the United States Patent and Trademark Office*